United States Patent
Gingras

(10) Patent No.: US 7,252,348 B2
(45) Date of Patent: Aug. 7, 2007

(54) WHEEL ASSEMBLY FOR A TRACKED VEHICLE

(75) Inventor: David Gingras, Orford (CA)

(73) Assignee: Camoplast Inc. (CA)

( * ) Notice: Subject to any disclaimer, the term of this patent is extended or adjusted under 35 U.S.C. 154(b) by 175 days.

(21) Appl. No.: 11/080,311

(22) Filed: Mar. 15, 2005

(65) Prior Publication Data

US 2005/0218720 A1 Oct. 6, 2005

(30) Foreign Application Priority Data

Apr. 6, 2004 (CA) .................................... 2463399

(51) Int. Cl.
*B62D 55/14* (2006.01)

(52) U.S. Cl. ..................... 305/136; 305/138; 301/13.2; 301/36.1

(58) Field of Classification Search ................ 305/136, 305/138; 301/13.2, 36.1, 114, 64.202, 64.303, 301/35.629, 35.628, 105.1, 13.1, 35.621
See application file for complete search history.

(56) References Cited

U.S. PATENT DOCUMENTS

| | | | | |
|---|---|---|---|---|
| 1,580,920 A | * | 4/1926 | Roe | ....................... 301/64.303 |
| 2,943,889 A | * | 7/1960 | Woldring et al. | ...... 301/64.304 |
| 3,797,895 A | | 3/1974 | Tomizawa | |
| 4,127,180 A | | 11/1978 | Coffman | |
| 6,129,426 A | * | 10/2000 | Tucker | ....................... 305/136 |
| 6,206,492 B1 | | 3/2001 | Moser | |

FOREIGN PATENT DOCUMENTS

| CA | 2124501 | 12/1994 |
|---|---|---|
| CA | 2249256 | 8/1999 |

* cited by examiner

*Primary Examiner*—Russell D. Stormer
*Assistant Examiner*—Kip Kotter
(74) *Attorney, Agent, or Firm*—Akerman Senterfitt

(57) ABSTRACT

There is provided a wheel assembly and associated method of mounting wheels about a hub, by providing a hub comprising a shoulder having a clearing space allowing a wheel introduced by one side of the hub to be pivoted to an opposite side thereof.

6 Claims, 2 Drawing Sheets

WHEEL ASSEMBLY FOR A TRACKED VEHICLE

CROSS REFERENCE TO RELATED APPLICATIONS

This application claims priority on a Canadian application No 2,463,399 filed on Apr. 6, 2004. All documents above are herein incorporated by reference.

FIELD OF THE INVENTION

The present invention relates to tracked vehicles. More specifically, the present invention is concerned with a wheel assembly for a tracked vehicle.

BACKGROUND OF THE INVENTION

Typically, track-type vehicles comprise track assembly that usually includes an endless belt, which wraps around a drive wheel, an idler wheel and a number of guide wheels supporting a lower ground engaging run of the track. The inner surface of the endless belt has a number of extending guide lugs, which are guided through a channel formed by the wheel arrangement. During use of the vehicle, the drive wheel rotates and engages the endless belt thereby causing the belt to rotate around the path defined by the drive wheel, idler wheel and guide wheels. Rotation of the endless belt causes each of the guide lugs to pass through the channel defined by the drive wheel, idler wheel and each of the guide wheels. Having the guide lugs passing through the guiding channel enables the belt to remain within the rolling path.

U.S. Pat. No. 6,129,426 issued in 2000 discloses a tracked vehicle with a guide wheel assembly that may be retrofitted and positioned in the track assembly in place of previously used single wheels.

There is still a need in the art for a wheel assembly allowing mounting a plurality of wheels on a single housing in conditions of limited access thereto.

SUMMARY OF THE INVENTION

More specifically, there is provided a wheel assembly comprising a hub and wheels to be mounted on the hub; wherein the hub comprises shoulders each including mounting clearings, the wheels being mounted to the hub by disks comprising lobes, the disks of the wheels being mounted radially from the hub on the shoulders of the hub.

There is further provided a wheel assembly for a tracked vehicle with a plurality of wheels mounted on each side of a hub by disks provided with lobes, the hub having a shoulder including mounting clearings, part of the plurality of wheels being introduced by a first side on the hub being mounted on a side opposite said first side across the shoulder of the hub, by passing the disks over the shoulder of the hub by passing the lobes of the disks through the mounting clearings.

There is further provided a method for mounting wheels on a hub from a first side thereof, comprising the steps of providing mounting clearings on shoulders of the hub; providing wheels comprising disks having lobes; introducing wheels to be mounted on a side of the hub opposite the side thereof by which the wheels are introduced relative to the shoulders, by passing the lobes of the respective disks through the mounting clearings to a desired position on the side of the hub opposite the side by the wheels are introduced relative to the shoulder; and directly mounting wheels to be mounted on the introduction side of the hub.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 2:
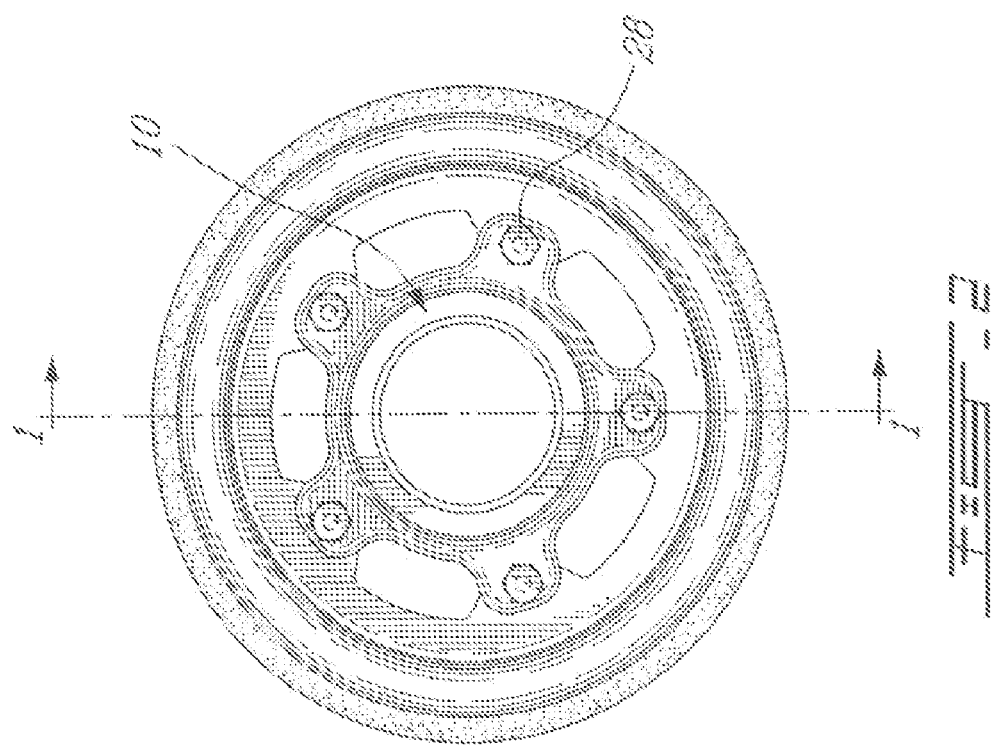
FIG. 2 is a projection view of the assembly of FIG. 1.

As illustrated in the Figures of the appended drawings, a wheel assembly according to an embodiment of the present invention comprises a hub 10 for mounting wheels 20.

The wheels 20 typically comprise disks 24 comprising lobes 25, made in a metal, such as steel or aluminium for example, securing a tire 22 resistant to wear and made in a material such as a composite, a rubber or urethane for example, or combination thereof. The tire 22 may further comprise reinforcement.

The retaining flanges 24 are mounted radially from the hub 10, mounted by means of a nut 26 and bolt 28 fastening means on shoulders 30 of the hub 10.

The shoulders 30 each include mounting clearings 32.

Figure 1:
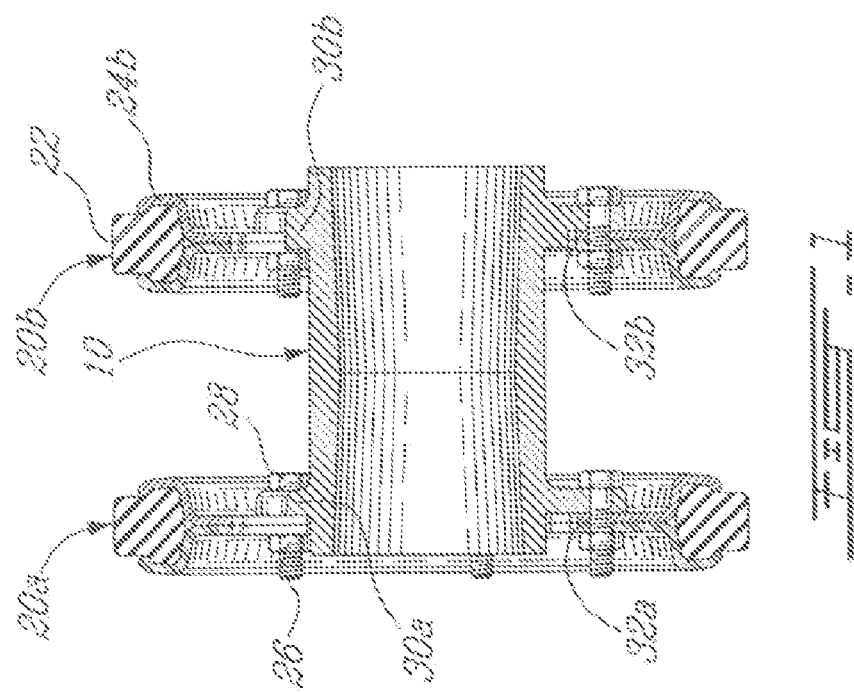
FIG. 1 is a cross section of a wheel assembly according to an embodiment of the present invention.
Figure 3:
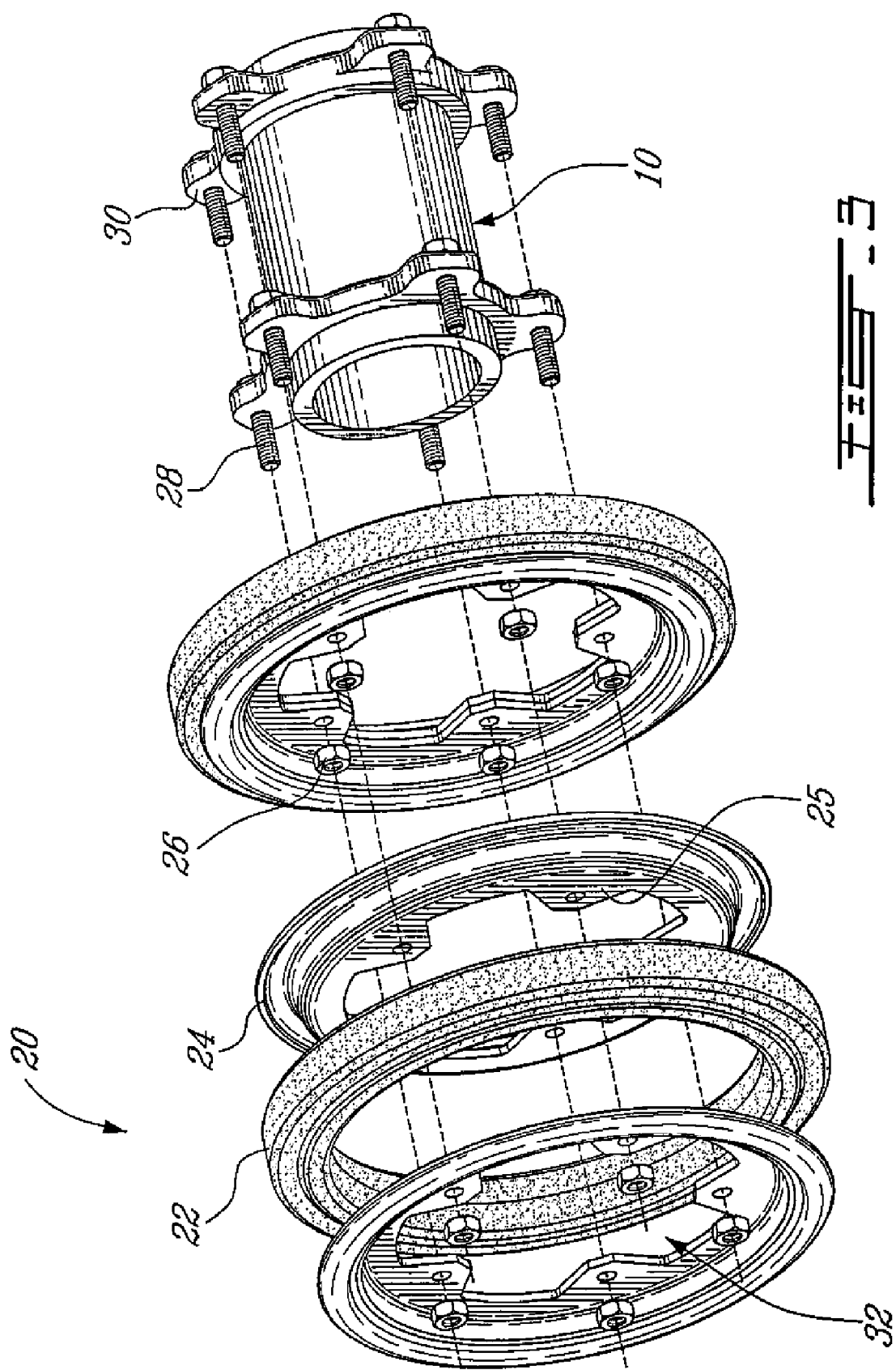
FIG. 3 is an exploded view of the assembly of FIG. 1.

FIG. 1 shows a left side wheel 20a and a right side wheel 20b mounted on a hub 10. For mounting a wheel 20 on the hub 10 on any side thereof, for example on a right inside, from the left inside, which may for example be an accessible side, the wheel 20b is introduced by a left inside on the hub 10, and its disk 24b passed over the shoulders 30a and 30b of the hub by passing the lobes 25 of the disk 24b through the mounting clearings 32a and 32b respectively (see FIG. 1) to its desired position on the right inside of the hub 10.

People in the art will appreciate that the wheel assembly of the present invention allows mounting a number of wheels from a same side of the track assembly without needing to disassemble nor the hub or involved bearings, thereby allowing greatly reducing maintenance costs.

Moreover, since such an assembly allows mounting wheels of a same diameter at any position about the hub, fabrication costs are also greatly reduced, since only one type of wheels is required.

Such a wheel assembly may be in a variety of tracked vehicle, including for example industrial skid steer loaders, snow grooming machines and agricultural tractor.

Although the present invention has been described hereinabove by way of embodiments thereof, it may be modified, without departing from the nature and teachings of the subject invention as described herein.

What is claimed is:

1. A wheel assembly, comprising:
   a hub, comprising shoulders provided with mounting clearings; and
   wheels, each wheel comprising a disk for securing a tire, each disk having lobes and being mounted radially from the hub on one shoulder of the hub;
   wherein the wheels are mounted on the hub from a single accessible side thereof, including a first wheel to be mounted on the side of the hub opposite said accessible side and a second wheel to be mounted on said accessible side, the first wheel being introduced by the single accessible side on the hub and the disk of said first wheel being passed across the shoulder of said accessible side, the lobes of the disk passing through the mounting clearings of the shoulder, and fixed on said shoulder opposite said single accessible side; the second wheel being introduced by the single accessible side and fixed to said shoulder on said single accessible side.

2. The wheel assembly according to claim 1, wherein each disk secures a tire resistant to wear.

3. The wheel assembly according to claim 2, wherein each tire is made in one of a composite, a rubber, urethane and combination thereof.

4. The wheel assembly according to claim 1, wherein said disks are made in a metallic material.

5. The wheel assembly according to claim 1, wherein said disks are made in one of steel and aluminium.

6. The wheel assembly according to claim 1, wherein said disks are mounted by means of a nut and bolt fastening means on the shoulders of the hub.

* * * * *